(12) United States Patent
Andersson et al.

(10) Patent No.: US 8,942,505 B2
(45) Date of Patent: Jan. 27, 2015

(54) ADAPTIVE FILTER REPRESENTATION

(75) Inventors: Kenneth Andersson, Gävle (SE); Richard Sjöberg, Tumba (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1046 days.

(21) Appl. No.: 12/522,643

(22) PCT Filed: Dec. 17, 2007

(86) PCT No.: PCT/SE2007/051083
§ 371 (c)(1), (2), (4) Date: Jul. 9, 2009

(87) PCT Pub. No.: WO2008/085109
PCT Pub. Date: Jul. 17, 2008

(65) Prior Publication Data
US 2010/0098345 A1 Apr. 22, 2010

Related U.S. Application Data

(60) Provisional application No. 60/884,042, filed on Jan. 9, 2007.

(51) Int. Cl.
G06K 9/36 (2006.01)
H04N 19/80 (2014.01)
H04N 19/194 (2014.01)
H04N 19/61 (2014.01)
H04N 19/176 (2014.01)
H04N 19/117 (2014.01)

(52) U.S. Cl.
CPC ....... *H04N 19/0896* (2013.01); *H04N 19/0089* (2013.01); *H04N 19/00363* (2013.01); *H04N 19/00781* (2013.01); *H04N 19/00278* (2013.01); *H04N 19/00066* (2013.01)
USPC .......................................... 382/238

(58) Field of Classification Search
None
See application file for complete search history.

(56) References Cited

U.S. PATENT DOCUMENTS 5,920,654 A * 7/1999 Someya et al. ............... 382/270
5,959,676 A * 9/1999 Kondo ......................... 348/421.1
5,973,745 A * 10/1999 Kondo ......................... 348/421.1
2002/0036705 A1* 3/2002 Lee et al. ..................... 348/459

(Continued)

FOREIGN PATENT DOCUMENTS

WO WO 2006/108654 A2 10/2006

OTHER PUBLICATIONS

Wedi, T. Adaptive Interpolation Filter for Motion and Aliasing Compensated Prediction. Visual Communications and Image Processing, San Jose, USA. Jan. 21, 2002.

(Continued)

*Primary Examiner* — Jingge Wu

(57) ABSTRACT

The present invention teaches a filter process used in intra or inter prediction of pixel blocks. A first, optionally interpolation, filter is applied in the first filter process to get filtered, optionally interpolated, pixel values. A differential filter and an adaptive gain are utilized in the second process for improving the prediction performance. The adaptivity of the gain can be made even on block basis, allowing a fine tuning of the pixel prediction and/or a fine tuning of pixel rotation and zooming. Alternatively, a combined one-step filter process using the interpolation filter, the differential filter and the adaptive gain is applied to the pixel values.

34 Claims, 7 Drawing Sheets

(56) References Cited

U.S. PATENT DOCUMENTS

2003/0169931 A1* 9/2003 Lainema ............... 382/236
2008/0240241 A1* 10/2008 Mishima et al. ......... 375/240.15

OTHER PUBLICATIONS

Chono, et al, Modified Adaptive Interpolation Filter. ITU Study Group 16—Video Coding Experts Group—ISO/IEC MPEG & ITU-T VCEG. Jul. 26, 2007.

* cited by examiner

Fig. 8
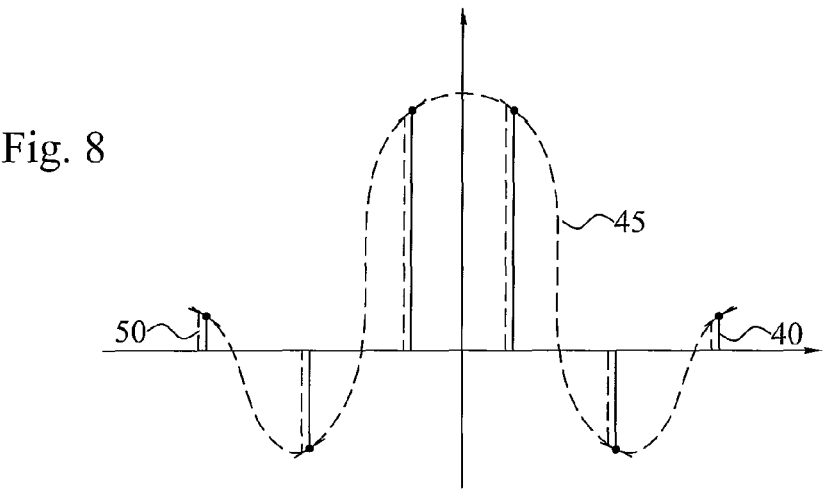
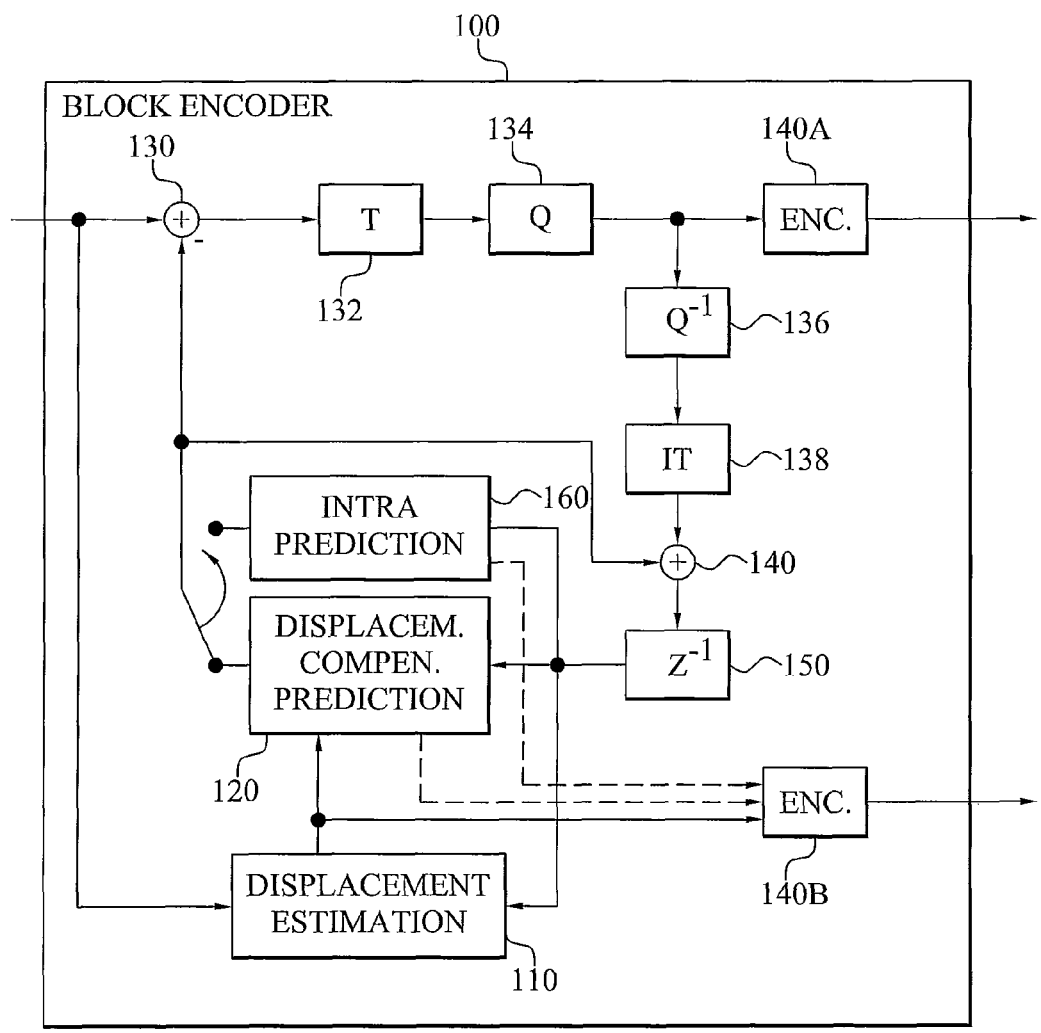
Fig. 12

ADAPTIVE FILTER REPRESENTATION

CROSS-REFERENCE TO RELATED APPLICATIONS

This application is a National Stage application, under 35 U.S.C. §371, of International Application No. PCT/SE2007/051083, filed Dec. 27, 2007, which claims the benefit of U.S. Provisional Application No. 60/884,042, filed Jan. 9, 2007, the disclosures of which are fully incorporated herein by reference.

TECHNICAL FIELD

The present invention generally relates to image processing, and in particular to filter representations useful in inter and intra prediction applicable to video and video coding.

BACKGROUND

Temporal and spatial redundancy can be exploited using prediction to make a compact representation of the video signal possible. Pixel prediction is an important part of video coding standards such as H.261, H.263, MPEG-4 and H.264 [1]. In H.264 there are three pixel prediction methods utilized namely intra, inter and bi-prediction. Intra prediction provides a spatial prediction of the current block from previously decoded pixels of current frame. Inter prediction gives a temporal prediction of the current block using a corresponding but displaced block in a previously decoded frame, e.g. reference block. Bi-directional prediction gives a weighted average of two inter predictions.

The inter prediction method of H.264 can achieve fractional-pel resolution in the motion estimation. A fixed half-pel filter with filter taps [1 −5 20 20 −5 1]/32 is first applicable to obtain initial half-pel resolution. A bilinear filter can then be applied on a full-pel sample and a half-pel sample to achieve quarter-pel resolution. These fractional-pel interpolation filters used in H.264 are fixed, implying the same filter taps are used regardless of which particular block that is encoded.

Many techniques have been suggested to improve the inter prediction over the years, for instance by employing adaptive interpolation filters. Such an approach has been suggested by first determining displacement vectors using the fixed H.264 interpolation filter for each image block to be coded. With the obtained displacement vectors, a calculation of adaptive filter coefficients of separable 6-tap adaptive filter is then done afterwards. As a consequence, three horizontal adaptive interpolation filters and twelve vertical adaptive interpolation filters are calculated through a prediction error minimization.

SUMMARY

Even though the introduction of adaptive interpolation filters improved the inter prediction for fractional-pel resolution, there is still a need for further improving the performance in image and video encoding and decoding.

It is a general object of the present invention to provide an adaptive representation of filters for use in image and video coding.

It is a particular object of the invention to provide adaptation of interpolation filters utilizing differential filters and adaptive filter gains.

Yet another particular object of the invention is to provide shaping filter adaptation utilizing differential filters and adaptive filter gains.

These and other objects are met by the invention as defined by the accompanying patent claims.

Briefly, the present invention involves providing an adaptive filter representation by utilizing a differential filter and an adaptive filter gain in addition to a tradition pixel filter, such as an interpolation filter. This differential filter and adaptive gain can be utilized in a second filtering process to filter pixels in block coding and decoding, in particular the intra and inter prediction of blocks performed in the coding and decoding. The differential filter and adaptive filter gain can also be used together with the pixel filter to form a combined adaptive filter in a single filter process.

A parameter representation, such as displacement vector or intra prediction direction, is estimated based on at least a portion of the pixel values in the block to be encoded. The displacement representation allows identification of a reference block or group of pixels in the current frame or in another reference frame. The pixel values of this reference block may then be filtered by at least one filter, which is preferably an interpolation filter, in a first filtering process. The filter in this first filter process is typically a fixed filter or a frame-specific filter, implying that one and the same filter or a same set of filters is utilized for encoding all blocks in the current frame having a given displacement vector.

A differential filter having filter coefficients summing up to zero or at least close to zero is provided for the current block. Also this filter can be fixed or frame-specific, even though a finer degree of adaptation down to slice- or macroblock-specific differential filters is also possible. In a particular embodiment, at least the central part of differential filter is a non-symmetric differential derivative filter of the filter from the first filter process.

The fine-level of adaptation in the second filter process is obtained by utilizing an adaptive filter gain. The gain is preferably block-specific but can even be pixel specific. The second filter is calculated based on the differential filter and the adaptive filter gain. The filter is applied to the reference or interpolated pixel values of the first process to obtain the final prediction of the current block.

An alternative is to generate a single combined filter from the first filter, differential filter and apply the single filter to obtain the prediction. A single filter can be constructed by summing the first filter and the differential filter or by convolving the filters and add the result to the first filter.

A residual error is calculated based on the difference in pixel values in the block and the block prediction. An encoded representation of the block comprises this residual error together with the displacement representation.

In the block decoding, the displacement representation is used for identifying the reference block, the pixel values of which are processed in the filter process to get the filtered pixel values. A decoded block representation is then obtained based on these filtered pixel values and the residual error.

The invention also relates to an encoder and decoder.

SHORT DESCRIPTION OF THE DRAWINGS

The invention together with further objects and advantages thereof, may best be understood by making reference to the following description taken together with the accompanying drawings, in which:

FIG. 6 is a flow diagram illustrating an embodiment of the steps of providing filter, providing differential filter and determining filter gain filter of FIG. 1 in more detail;

FIG. 8 is an illustration of fine-tuning sub-pel interpolation according to an embodiment of the present invention;

FIG. 12 is a schematic block diagram of a block encoder embodiment of the present invention;

DETAILED DESCRIPTION

Figure 1:
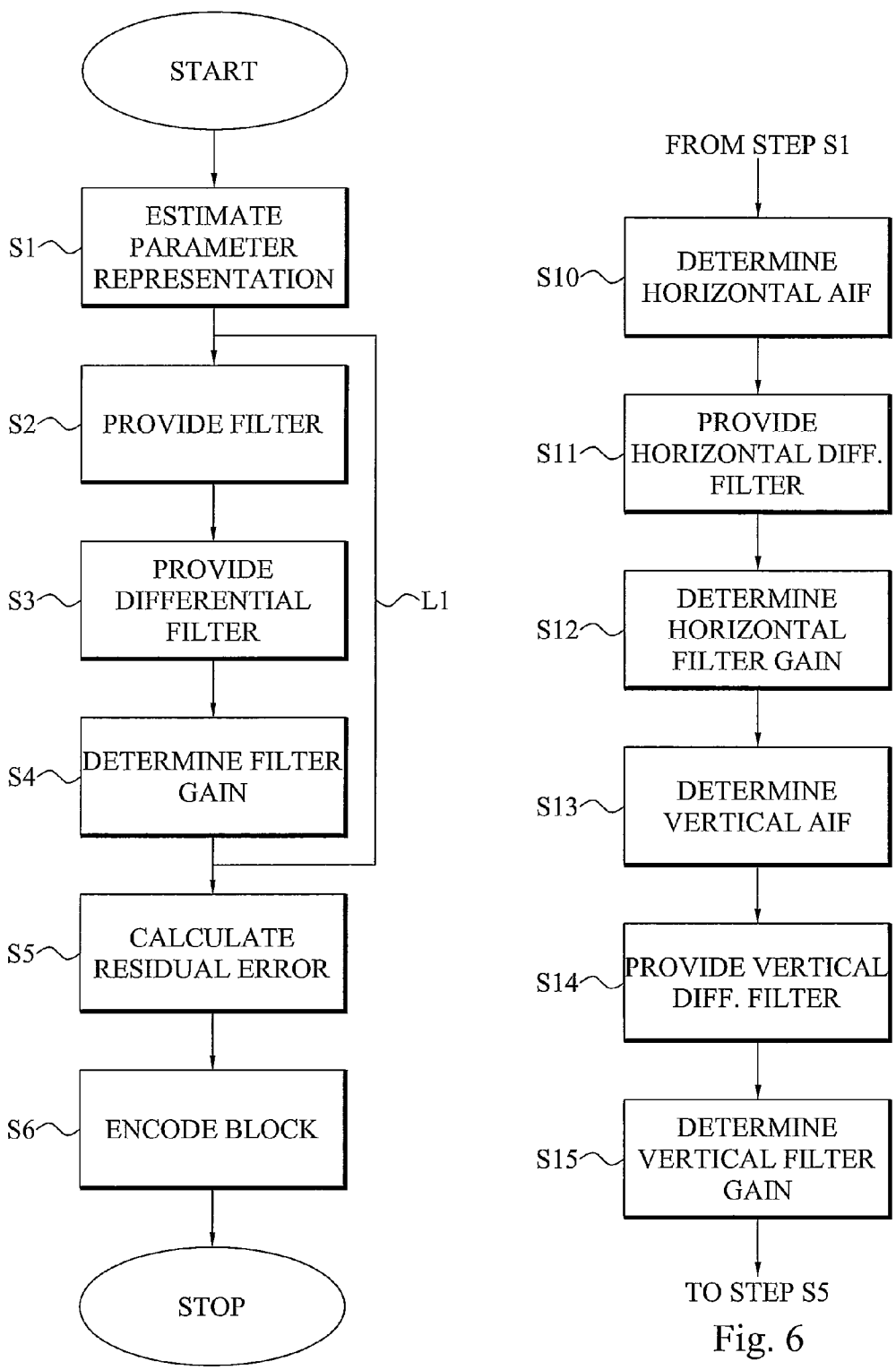
FIG. 1 is a flow diagram of a block encoding method according to the present invention.

Throughout the drawings, the same reference characters will be used for corresponding or similar elements.

The present invention generally relates to image processing and in particular to an adaptive filtering process useful in connection with encoding and decoding pixel blocks in a frame of an image or a video sequence. The adaptive filtering process of the invention utilizes an adaptive gain parameter and a differential filter for improving inter or intra prediction, improving the final reconstruction by in-loop or post filtering and/or improving the rate distortion performance. The adaptive filtering of the invention is applicable in connection with traditional interpolation filtering and pixel filtering utilized in intra and inter prediction or in in-loop or post filtering to form an improved one-step or a two-step filtering process.

The present invention also teaches the representation of the traditional adaptive interpolation filter into a reference interpolation filter and one or more basic differential filters having adaptive filter gains. Some examples of differential filters are a differential filter with main motive to displace the reference interpolation filter, a differential filter with main motive to symmetrically shape the interpolation filter and a differential filter with main motive to asymmetrically shape the interpolation filter. This separation of an interpolation filter into some basic modification parts is suited for both local and global representation of interpolation filters.

In the present invention, a video sequence comprises multiple, i.e. at least two, frames or pictures. Such a frame can in turn be regarded as composed of a series of one or more slices, where such a slice consists of one or more macroblocks of image elements or pixels. In the present invention, the expression "image element" is used to denote a smallest element of a frame or picture in a video sequence. Such an image element has associated image element properties, such as color (in the red, green, blue, RGB, space) or luminance (Y) and chrominance (Cr, Cb or sometimes denoted U, V). A typical example of an image element is a pixel of a frame or picture.

The image elements are organized into groups of image elements. The expression "group of image element" denotes any of the prior art known partitions of frames and slices into collections of image elements that are handled together during decoding and encoding. Generally, such a group is a rectangular (M×N) or square (M×M) group of image elements. An example of such a grouping is a macroblock in the video compression standard. Such a macroblock generally has a size of 16×16 image elements. A macroblock can consists of multiple so-called sub-macroblock partitions, such as 16×8, 8×16, 8×8, 8×4, 4×8 and 4×4 image elements. The 8×8 sub-macroblock partition is often denoted as a sub-macroblock or sub-block, whereas a 4×4 partition is often denoted block.

FIG. 1 is a flow diagram illustrating a method of encoding a group of image elements in a frame of an image or video sequence according to the present invention. A first step S1 estimates a parameter or displacement representation associated with or pointing towards a reference group of image elements. This reference group or more correctly reference property values of the image elements in the group are to be used in the coding of the property values of the image elements in the current block.

The parameter representation can refer to the reference group in another frame or reference frame in the video sequence for the purpose of performing an inter coding of the group. Such a displacement representation then comprises an identifier of the reference frame, unless this is pre-defined, such as using the most previous frame i−1 in the video sequence as reference frame for groups in the current frame i. Furthermore, the representation comprises a so-called displacement or motion vector determining the position of the reference group in the reference frame relative the corresponding group position the current group of image elements occupies in the frame. The estimation generally involves performing a parameter estimation that can be conducted according to prior art techniques, such as described in [1-4]. Briefly, a number of candidate reference groups in or more candidate reference frames are investigated for determining which of these candidate reference groups that has image element property values that best, in some sense, matches the image element property values of the current group to be encoded. The error criterion used in this group search can be the sum of the absolute difference (SAD) of the property values in the candidate group and the current group or sum of squared difference (SSD).

Alternatively, the parameter representation can refer to a reference group of image elements in the same frame as the current group in the case of intra coding. Intra-coding can be performed according to different prediction modes associated with different prediction directions. In such a case, the displacement representation defines one of the available prediction modes or directions. The estimation can be performed according to well-known techniques, such as disclosed in [1, 5]. Briefly, a rate distortion optimization technique can be used for determining, based on the property values of the current group of image elements, which the intra predictions that gives best, in some sense, rate distortion performance.

A next step S2 provides a filter or a set of filters that is applicable to the proper values of at least a portion of the image elements in the identified reference group. In a preferred embodiment of the present invention the provided filter or the filters of the provided set are so-called interpolation filters. Such interpolation filters are applicable to image elements to obtain sub-pel or fractional-pel property values. For instance, one or more interpolation filters can be applied to a set of property values in the reference group to obtain half-pel (½), quarter-pel (¼) or even eighth-pel (⅛) resolution. By utilizing pixel interpolation, more accurate reference property values can be utilized as compared to being limited to full-pel values in the intra or inter prediction. As is well known in the art, a first interpolation filter can be provided for obtaining a first level of sub-pel resolution, such as half-pel resolution. A second interpolation filter, such as a bilinear filter, can then be applied to a half-pel pixel value and its neighboring full pixel value to obtain a second level of sub-pel resolution, such as quarter-pel resolution.

The interpolation filter(s) provided in step S2 can be fixed filters, such as the interpolation filters utilized in H.264. In H.264 a filter having filter coefficients [1 −5 20 20 −1]/32 is first applied for obtaining half-pel values followed by a bilinear filter for quarter-pel resolution, e.g. [1 −5 52 20 −5 1]/64 or [1 −5 20 52 −5 1]/64. Alternatively, adaptive interpolation filters can be utilized, such as disclosed in [2-4]. In such a case, the adaptive filters can be determined on a frame-basis or slice-basis. The providing step S2 then involves re-using an adaptive filter previously determined for the frame to which the current block belongs. Alternatively, the providing step S2 involves calculating the filter coefficients of the adaptive filter, which is described further herein.

In the case of adaptive filters, the filter coefficients are determined in a parameterization procedure that involves minimizing a prediction error between property values filtered with a candidate filter and the original property values in the frame or slice. The candidate filter resulting in smallest error, such as SAD or SSD, is then selected and used in step S2.

The filter(s) provided in step S2 do(es) not necessarily have to be interpolation filters but could utilized for other purposes than obtaining sub-pel resolution, such as shaping the frequency response.

It is anticipated by the invention that the filter(s) provided in step S2 could be non-separable (2-dimensional) filter, i.e. filtering both in the vertical and the horizontal direction. Alternatively, separable vertical and horizontal filters are provided in step S2, which is further described below.

A next step S3 provides at least one differential filter. As is known in the art, the sum of the filter coefficients of a differential filter equals zero or is at least close to zero. The differential filter may be used in the second filter or a combined filter process to further improve the inter/intra prediction or obtain a better rate distortion performance.

In a first preferred embodiment, the provided differential filter is a non-symmetrical differential filter. Such a non-symmetrical filter can be utilized for performing a fine adjustment of the filter coefficients of the interpolation filter provided in step S2. FIG. 8 schematically illustrates this concept. In the figure the original filter taps are illustrated by the full line 40. A second filter process based on the non-symmetrical differential filter can be regarded as slightly moving the tap position into the positions indicated by the hatched lines 50. Such a fine tuning of the interpolation can have a significant impact in obtaining well-matching reference property values to be used as representation of the property values of the current block.

If the first filter has filter taps [1 −5 20 52 −5 1]/64, corresponding to the filter used for a quarter-pel interpolation in H.264, the filter taps of the non-symmetric differential filter can be [−1 5 −20 12 5 −1]/16. By varying the gain, the filter taps of the corresponding single filter can for example vary between [0 0 0 1 0 0] when the gain is equal to 0.25, i.e. no filtering at all, and the H.264 half-pel filter when gain is equal −0.25.

In another preferred embodiment, the provided differential filter is a symmetrical differential filter. Such a symmetrical differential filter can be used as a shaping filter or as a component of a shaping filter for shaping the frequency response of the interpolation filter. This fine tuning of the frequency response of the interpolation can have a significant impact in obtaining well-matching reference property values to be used as representation of the property values of the current block. The filter taps of this differential filter can be selected so that the shaping filter gets flatter or more varying. If the first filter has filter taps [1 −5 20 20 −5 1]/32, i.e. the half-pel interpolation filter in H.264, the filter taps of the symmetrical differential filter can be [0 1 −1 −1 1 0]. By varying the gain, the filter taps of the corresponding single filter can for example vary between [1 3 12 12 3 1]/32 when the gain is equal to 0.25, and [1 −13 28 28 −13 1]/32 when gain is equal −0.25.

In a further embodiment, the provided differential filter is a non-symmetrical differential filter. Such a non-symmetrical differential filter can also be used as a shaping filter or as a component of a shaping filter for shaping the frequency response of the interpolation filter. This fine tuning of the frequency response of the interpolation can have a significant impact in obtaining well-matching reference property values to be used as representation of the property values of the current block. The filter taps of the differential filter can be selected so that the shaping filter gets flatter on one side of the filter and more varying on the other side or vice versa. If the first filter has filter taps [1 −5 20 20 −5 1]/32, i.e. the half-pel interpolation filter in H.264, the filter taps of the asymmetrical differential filter can be [−1 1 0 0 −1 1]. By varying the gain, the filter taps of the corresponding single filter can for example vary between [2 −6 20 20 −4 0]/32 when the gain is equal to −1/32, and [0 −4 20 20 −6 2]/32 when gain is equal 1/32. As can be seen in this case the filter length can vary from 6 tap to 5 tap.

The (interpolation) filter provided in step S2, typically is a fixed filter (fixed filter set) or is adapted on frame or slice basis. The differential filter can also be fixed or be calculated on a frame- or slice-basis. However, the present invention also contemplates that the differential filter is determined on a lower level, such as on macroblock or even block level. Furthermore, different differential filters can be determined based on different filtering position in a group of image elements to obtain adaptivity with respond to pixel portions within a block to be predicted. However, in a preferred embodiment the adaptivity of the second filtering process is used solely or at least to a larger extent with the adaptive filter gain.

A next step S4 determines a filter gain that is applicable to the differential filter provided in step S3 or a filter obtainable based on the differential filter from step S3. The filter gain is determined based on the differential filter, the property values of the group to encoded, the filter provided in step S2 and the reference property values. The filter gain g is preferably an adaptive gain g that is determined or estimated based on minimizing the prediction error E defined as:

$$E^2 = \sum_n \left( S_n - \sum_i P_{n-i} IF_i + \sum_j P_{n-j} g DF_j \right)^2$$

where $S_n$ represents the property values of pixels group n in the current frame, $P_{n-i}$ is the reference property values of pixels of reference group n−i in the reference frame, IF is the (interpolation) filter provided in step S2, DF is the differential filter and g is the filter gain. It should be noted that after determination of the filter gain g, the filter taps of the adaptive filter can be computed and the filtering can be described with a single filtering process.

The gain can then be obtained by minimizing the error based on:

$$\frac{\partial E}{\partial g} = 0$$

This will then result in a number of linear equations corresponding to the number of unknown gains and can be written as:

$$Ax=b$$

where x corresponds to the unknown gains, A corresponds to the autocorrelation matrix of the "pre-filtered" reference image element values with corresponding differential filter and b is the cross correlation vector between the reference image element values and the original image element values (after removing the contribution from the reference interpolation filter). Standard solutions for determining x can be used.

The filter gain is preferably determined for a specific subset of the frame to be interpolated. It is also possible to determine filter gains on a macroblock- or block-basis and to even have different gains based on image element positions or local image values. For instance a basic gain can be determined for the group of image elements. A position-specific offset is then applied to the gain when traveling along a row or column in the group. In such a case, the gain could be defined as:

$$g(x)=xk_x+g_x$$

$$g(y)=yk_y+g_y$$

or $$g(x,y)=xk_x+yk_y+g$$

where $k_x$, $k_y$ are constants, x, y refer to image element positions in the group and $g_x$, $g_y$, g are basic gain values for the group.

As was briefly mentioned above, there can be different filter direction in the group of image elements, e.g. horizontal and vertical directions. In such a case, at least one filter, at least one differential filter and at least one filter gain can be provided and determined per direction, as is schematically illustrated by the line L1.

It should be noted that it also is possible to also represent the reference interpolation filter with use of the invention as:

$$g_1 \times [0\ 1\ 1\ 1\ 1\ 0] + g_2 \times [1\ 0\ 0\ 0\ 0\ 1] + g_3 \times [0\ 0\ 1\ -1\ 0\ 0] + g_4 \times [0\ 1\ -1\ -1\ 1\ 0]$$

When $g_1=7.5$, $g_2=1$, $g_3=0$, $g_4=-12.5$, the H.264 half-pel interpolation filter [1 −5 20 20 −5 1] is achieved. Thus, multiple gains and multiple differential filters can be determined and used for a current block of image elements.

A next step S5 calculates a residual error based on the property values of the current block, the reference property values, the parameter representation, the filter provided in step S2, the gain determined in step S4 and the differential filter from step S3 or a filter obtainable therefrom. The calculation can be performed as defined below:

$$e_{x,y} = S_{x,y} - \tilde{S}_{x,y}$$

wherein $e_{x,y}$ is the residual error at image element position x, y in the current group, $S_{x,y}$ is the property value of the image element at position x, y, $\tilde{S}_{x,y}$ is the property value of image element at position x, y in the prediction of the current block, where this prediction is obtained through a filtering of the image element property values in the reference group.

The current group is then encoded in step S6 as a representation of the displacement representation and a representation of the residual error.

After a reconstructed frame has been generated, an optimal in-loop or post-filter can optionally be determined and applied on the reconstructed frame. In this case, the least square optimization is performed between the original and a reconstruction filtered by the invention. The determined parameters are then transmitted to the decoder.

It is also possible to provide a representation of the filter from step S2, a representation of the differential filter from step S3 and/or a representation of the filter gain from step S4. However, in most general aspect these representations may not be required by the decoder for decoding the now encoded block. For instance, the filter from step S2 can be a fixed filter and therefore the decoder is pre-coded with the filter coefficients of the filter. Alternatively, filter coefficients can be re-used between multiple groups in a same frame or slice and are therefore provided on frame or slice basis. Furthermore, the decoder can also be able to calculate the filter, differential filter and/or the filter gain based on previously decoded pixel values and therefore not dedicated information transmittal is required.

For instance, the gain of the second filter process can be controlled by the output of the differential filter. This enables the second filter process, through the adaptivity of the gain, to adapt with respect to local contrast, enabling weaker filtering of strong image edges and stronger filtering of weak edges.

The method then ends.

Figures 2, 3:
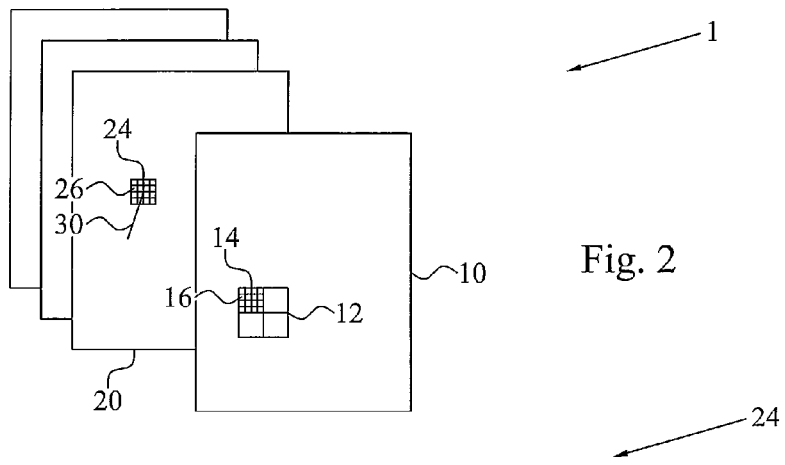
FIG. 2 is a schematic illustration of a video sequence of frames.
FIG. 3 is an illustration of a block of image elements and interpolated sub-pel image elements.

FIG. 2 is a schematic overview of a video sequence 1 comprising multiple image frames 10, 20. Each frame comprises macroblocks 12, such as 16×16 pixels 16 macroblocks 12. The macroblocks 12 can in turn be divided into smaller elements, such as 4×4 pixel blocks 14. The figure also illustrates the concept of displacement vectors in the case of inter coding. A current block 14 of pixels 16 to be encoded has an assigned displacement vector 30 that is estimated in a motion compensation prediction procedure. The vector 30 points towards a reference block 24 of pixels in a reference frame 20 in the video sequence.

FIG. 3 illustrates the pixel values of the reference block 24 in the reference frame and also some values of neighboring blocks in the reference frame. The figure illustrates the concept of interpolating half-pel and quarter-pel values based on the full-pel pixel values. In the figure, full-pel values are denoted with upper-case letters, while sub-pel values are denoted with lower-case letters.

In the illustrated figure 6-tap interpolation filters are assumed. In a first embodiment, such a filter is first applied row by row to calculate the values b1, b2, b, b4 to b6. The same filter or another interpolation filter can then applied column by column to obtain the values d1 to d2, h and k. This filter can also be used on the column formed by b1, b2, b, b4 to b6 to calculate j. All these values are half-pel values. A bilinear filter can then be applied at already calculated half-pel positions and existing full-pel positions to get the quarter-pel values a, c, d, e, g, l, m, o, a4 and c4.

Alternatively, three separate 6-tap horizontal filters can be used and applied to C1 to C6 for calculating the half-21 and quarter-pel 23 values a, b and c. The same horizontal filters are also preferably applied to the rows to obtain the values $a_i$, $b_i$ and $c_i$, where i=1, 2, 4, 5, 6. 12 vertical interpolation filters can then be applied on the columns A3-F3, a1-a6, b1-b6, c1-c6 (three filters per column) to calculate the remaining half-25 and quarter-pel 27 values. The block formed by the pixel values C3, a-o then forms an interpolated prediction of the current block. This interpolated prediction is then further processed in a second filter process utilizing the differential filter and the adaptive gain according to the invention.

It is evident from FIG. 3, that the prediction of the current block following the first filter process (interpolation) may contain some full-pel values and some sub-pel values, possibly of different fractional levels.

Figure 4:
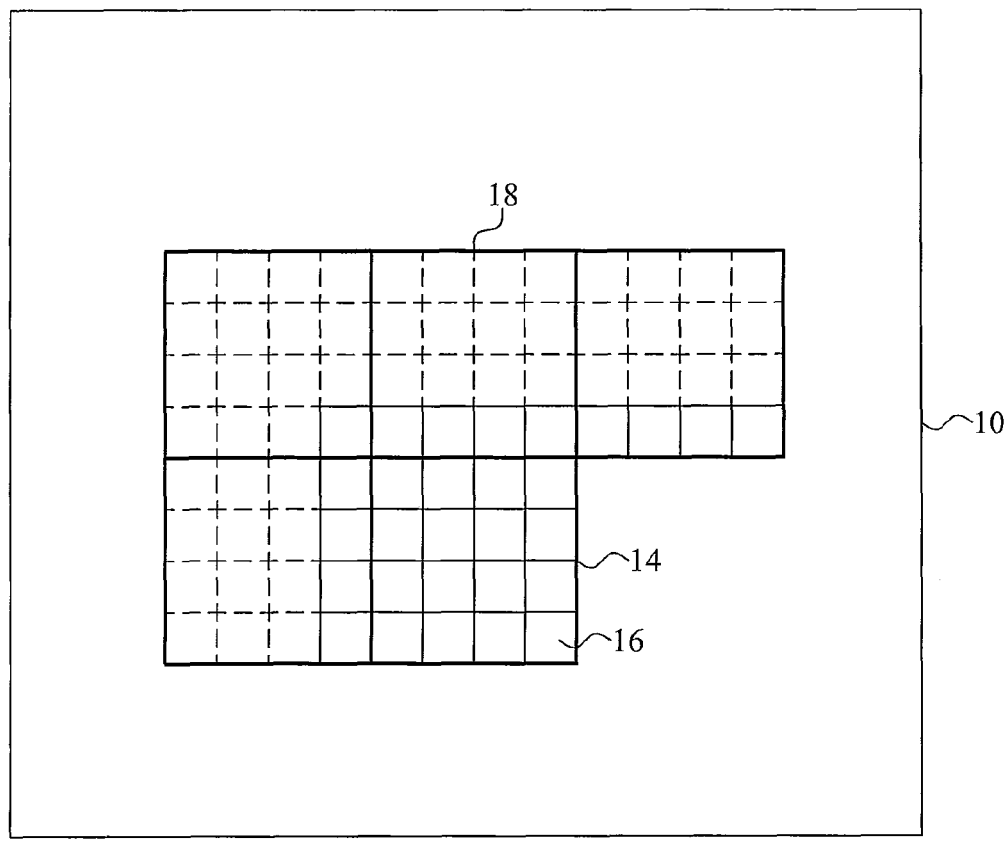
FIG. 4 is a schematic illustration of a frame in a video sequence.
Figure 5:
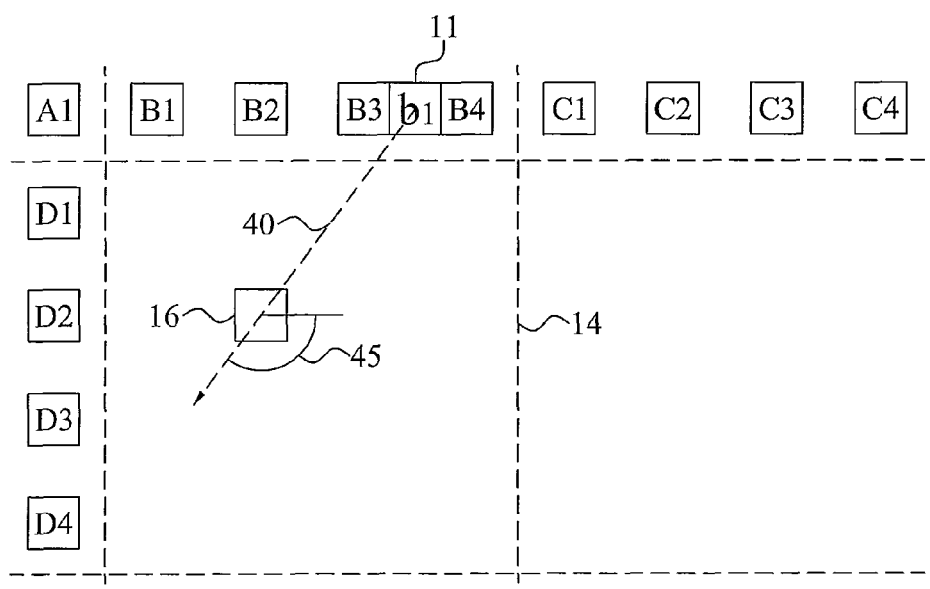
FIG. 5 is an illustration of a block of image elements intra-coded to sub-pel resolution.

FIG. 4 is a schematic drawing of a portion of an image frame 10 having multiple pixel blocks 14, 18. In intra prediction, a reference group consists of pixel from one or more neighboring blocks 18 in the same frame 10. Which neighboring block 18 the pixel values are fetched from depends on the displacement representation assigned to the current block 14. FIG. 5 illustrates this concept together with intra interpolation. In this case, a prediction for the pixel value of a pixel 16 in the block 14 is an interpolated value 21 from a block positioned diagonally above the current block. The vector 40 illustrates the prediction direction used in the intra prediction. In such a case, there may be different sets of available intra predictions and displacement representations according to Table I below:

TABLE I

| Mode index | Intra prediction directions | | | | |
|---|---|---|---|---|---|
| | Intra prediction set | | | | |
| | 0 | 1 | 2 | 3 | 4 |
| 0 | −90° | −90° | −90° | −90° | −90° |
| 1 | 0° | 0° | 0° | 0° | 0° |
| 2 | DC | DC | DC | DC | DC |
| 3 | −45° | −5° | −85° | −10° | −80° |
| 4 | −135° | 5° | −95° | 10° | −100° |
| 5 | −112.5° | −15° | −75° | −20° | −70° |
| 6 | 22.5° | 15° | −105° | 20° | −110° |
| 7 | −67.5° | −30° | −60° | −40° | −50° |
| 8 | −22.5° | 30° | −120° | 40° | −130° |

The numbers listed in Table I refers to the angle 45 of the intra prediction vector 40 relative the horizontal axis. For the intra prediction directions of sets 1-4, pixel interpolation may be required. The teachings of the present invention is in particular applicable to these sets but can also be used in connection with non-interpolated pixel values that are first filtered before being further processed or shaped according to the present invention.

FIG. 6 is a flow diagram illustrating an embodiment of the providing and determining steps S2 to S4 of FIG. 1. The method starts in step S10 where at least one horizontal adaptive interpolation filter (AIF) is determined based on the image element properties of the current group and the reference group. The coefficients $h_i$, $0 \leq i < N-1$ of the horizontal AIF are preferably calculated analytically for each sub-pel position to be interpolated by minimization of the prediction error E defined as:

$$E^2 = \sum_{x,y} \left( S_{x,y} - \sum_i h_i \times P_{\tilde{x}+i,y} \right)^2$$

where $S_{x,y}$ is the property value of an image element at position x, y in the current frame, $P_{\tilde{x}+i,y}$ is the reference property value of image element at position $\tilde{x}+i,y$ in the reference frame, $\tilde{x}=x+MV_x-FO$ with $MV_x$ as a horizontal component of the displacement vector and FO is equal to the length N of the horizontal filter divided by 2. The equation above is differentiated with respect to the unknown filter coefficients to find the minimum of the prediction error. Resulting, a set of equations equal to the number of filter coefficients has to be solved. This process is done for each sub-pel position in the horizontal direction independently. With reference to FIG. 3, preferably three horizontal filters with N-taps, such as 6 six taps, are obtained. These filters can be used for calculating the horizontal sub-pels a, b and c. These horizontal AIF are preferably re-usable also for other groups of image elements in the current frame, which has the same displacement vector as the current group. Alternatively, the horizontal filters are fixed for respective sub-pel position.

A next step S11 provides at least one horizontal differential filter. Preferably one such horizontal differential filter is provided per AIF determined in step S10. In a preferred embodiment, the differential filters are non-symmetrical differential filters that are determined based on the AIF calculated in step S10. Preferably, the non-symmetric differential filters are respective first order derivative filters of the horizontal AIF. Thus, for each horizontal AIF a derivative filter having non-symmetric filter coefficients, the sum of which equals zero, is determined in step S11. If the AIFs are determined on a frame-basis, preferably adapted per displacement vector, also the non-symmetrical differential derivative filters can be determined on a frame-basis.

A next step S12 determines a horizontal gain that is applicable to the differential filters. In a first embodiment, a single gain applicable to all horizontal differential filters is determined. Alternatively, a separate gain is determined for each AIF-differential filter pair. The gain is preferably determined based on minimization of a prediction error between the original pixel values and the predicted pixel values for those pixels in the macroblock (for a macroblock-specific gain) to which the horizontal filters are applied.

However the gains can also be determined to minimize the differences between the horizontal AIF filter coefficients and a coded representation of the horizontal AIF using a fixed reference interpolation filter and one or more differential filters with corresponding gains. One way to do this is to construct the autocorrelation matrix A and cross correlation vector b for the parameterization according to the invention by using proper portions of the autocorrelation matrix and cross correlation vector from the AIF. After the parameters of the invention have been solved, it is then straight forward to have both standard AIF and AIF according to the invention (AIFM) switchable in the codec. As an aid in this decision making, a rate distorsion (RD) metric can be used. The RD metric should consider the difference between the original and the prediction using respectively filters deployed for interpolation of a specific sub-pel position. A low complex rate distortion decision could be based on the SAD of the match between the $Ax_j-b$, a bias SAD factor and the number of bits required for the representation of $x_j$ times a lambda $\lambda$. A and b are set to the correlation matrix and vector of the AIF and $x_j$ is set to the filter taps of AIF or AIFM respectively. The bias SAD factor can be used to make it easier for AIFM to be selected since the filter taps from AIF are the optimal one given A and b. However since the filter taps are quantized that effect will somewhat be part of the SAD. The corresponding coding parameters to the filter taps $x_j$, which gives the least RD, is selected. AIFM should be selected when it is sufficiently close to the SAD of AIF when also considering the number of bits for coding the filter parameters. A binary flag can be used to indicate if coding parameters according to AIF or AIFM shall be used. In this way it is possible to select the representation that has the best trade off between coding cost and representation of the adaptive filter without explicitly making new predictions using quantized versions of respective filters.

As mentioned above, after the gains have been determined they are quantized and coded into bits in a video or image bit stream. The quantization step size could be dependent on the bit-rate or the residual Quantization Parameter (QP) deployed, potentially with larger step sizes for lower bit-rates. When coding the quantized gains it is beneficial to use prediction from quantized gains of other sub-pel positions using same differential filter. In this way only the prediction error need to be coded. This representation is more flexible regarding prediction compared to prior art, where the prediction is limited to be used between quantized filter taps of same type, e.g. quarter-pel or half-pel respectively, and in the same direction. Furthermore, prediction of quantized gains can be performed locally for each region to be coded from quantized gains of neighboring regions to deploy local adaptive filters. Also beneficial in the coding of quantized gains suggested in this invention is to omit coding of gains that rarely are used. This becomes even more important if the gains cost a lot to code. In these cases the gains are zeroed and coding can also be omitted by a binary flag.

As an aid in this decision making a rate distortion (RD) metric can be used. The RD metric should consider the difference between the original and the prediction using respectively filters deployed for interpolation of a specific sub-pel position. This invention suggest to select that parameters for each specific sub-pel filter shall be used if the RD cost of coding the filter parameters for the specific sub-pel position times lambda plus the corresponding SAD or SSD between the original and the prediction is lower than the SAD or SSD for the standard prediction. A low complex RDP (rate distorsion probability) metric proposed in this invention is to use the $SAD(A_i x_i - b_i)$, a SAD probability and the number of bits required for coding $x_i$ times lambda, where $A_i$ and $b_i$ are the autocorrelation matrix and cross correlation vector and $x_i$ is the coded parameters, for a sub-pel position i. The SAD probability should relate to the percentage of pixels of a frame that uses the filter. In this way the filter parameters for respective sub-pel position can be ranked and the sub-pel positions with highest RD can be removed.

Once the horizontal filters and (quantized) gains have been determined, corresponding vertical filters and gains are determined in steps S13 to S15. With reference to FIG. 3, preferably a set of 12 different vertical AIFs are determined. In such a case, these filters are used for determining the sub-pel values d-o in the figure. The filter coefficients $h_j$, $0 \geq j < M-1$ of the vertical interpolation filters can be estimated by minimizing a prediction error e defined as:

$$e^2 = \sum_{x,y} \left( S_{x,y} - \sum_j h_j \times \hat{P}_{\tilde{x}, \tilde{y}+j} \right)^2$$

where $\hat{P}_{\tilde{x}, \tilde{y}+j}$ is the property value of image element at position $\tilde{x}, \tilde{y}+j$ in the reference frame following filtering with a horizontal interpolation filter and a differential derivative filter multiplied by a filter gain, $\tilde{x} = 4 \times x + MV_x$ and $\tilde{y} = y + MV_y - FO$ with $MV_y$ as a vertical component of the displacement vector and FO is equal to the length M of said horizontal filter divided by 2. Alternatively, the vertical filters are fixed for respective sub-pel position.

A next step S14 determines corresponding vertical non-symmetric differential derivative filters, preferably one such filter per vertical AIF. This step is performed in similarity to step S11. Finally, one or more vertical filter gains applicable to the vertical derivative filters is determined in step S15.

As was briefly mentioned above, also fixed horizontal and vertical filters for specific sub-pel positions can be used instead of AIF in the additional steps S10 to S15. In this case an adaptive interpolation filter for each sub-pel position in FIG. 3 can be represented with a corresponding H.264 interpolation filter, and preferably more than one differential filter. A low complex deployment with good representation potential is to use an asymmetric differential filter [1 −1] to cover displacement and a symmetric differential filter [1 −1 −1 1] to cover frequency response shaping. To enable non-symmetric tails of the filter, following asymmetrical differential filter can be used [1 −1 0 0 1 −1]. As can be seen, the differential filters above are orthogonal to be able to encode the filter gains efficiently.

The present invention therefore provides, in this case per interpolation direction, a two-step filtering process. The first filtering step in the horizontal and vertical direction uses horizontal and vertical AIFs or IFs for obtaining half- or quarter-pel pixel resolutions. In a respective second process, a filter obtained by multiplying the gain to the filter coefficients of its associated derivate filter is applied to obtain a finer degree of interpolation tuning in order to improve the prediction even further. This process is illustrated in a simplified way in FIG. 8. The filter coefficients of an AIF or IF are illustrated in full lines 40 in the figure. The local variation around these taps is shown. This local variation is represented by the associated non-symmetric differential derivative filter. By adjusting the gain, we obtain new filtering positions and filter coefficients 50 either to the right, for positive gain values, or to the left, for negative gain values. The magnitude of the gain defines how far the filtering position is moved relative the original positions and coefficients 40.

The filtering process, in one direction, can therefore be schematically represented as:

$$AIF + gAIF_x$$

where AIF is the adaptive interpolation filter, g is the gain and $AIF_x$ is the non-symmetric differential derivative filter. Note though that the filter length of $AIF_x$ does not necessarily have to be the same as the length of AIF.

The derivative filters are non-symmetric with main motive to address the positioning of the filter coefficients but also to modify the frequency response.

An interpolation filter with fixed filter taps (IF) can be made adaptive in a similar manner to the adaptive interpolation filter discussed above.

Figure 7:
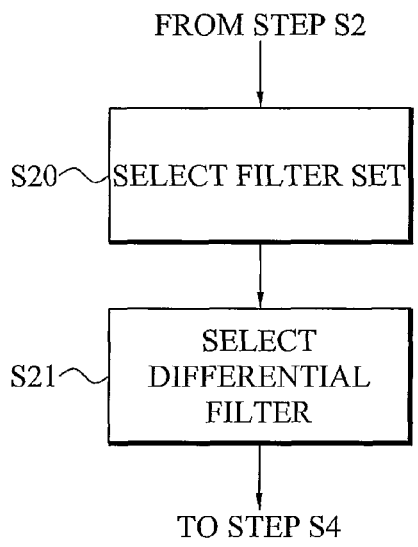
FIG. 7 is a flow diagram illustrating an embodiment of the differential filter providing step of FIG. 1 in more detail.

FIG. 7 is a flow diagram illustrating another embodiment of the differential filter providing step of FIG. 1. In this case, there are multiple available filter sets, each comprising one or more differential filters, preferably non-symmetric differential filters. These filters form a filter bank of pre-calculated that can be selected from during the block encoding. In a particular embodiment, each filter set is adapted for a particular fraction-pel interpolation. For instance, a first filter set is utilized for pixel values interpolated to half-pel resolution, whereas a second filter set is adapted for quarter-pel resolution, and so on. Step S20 therefore involves selecting a filter set based on a number Q, where Q is a positive integer number larger than one and Q represents the sub-pel resolution in the form of 1/Q-pel resolution. In other words Q=2 for half-pel and Q=4 for quarter-pel resolution.

A next step S21 selects a particular differential filter to use for a current block or for a current pixel in the block from the filter set. This step S21 can be performed through an exhaustive search by testing all available filters and all available filter gains applicable to the differential filter. Such an approach is achievable in the case the number of filters and gains are kept at a reasonable number. Otherwise more refined search algorithms can be used. An example of a refined search algorithm is to determine the filter and the filter gains using a RD metric as proposed above.

The method then continues to step S4 of FIG. 1. However, in the case of performing an exhaustive search, the differential filter and the gain are provided in a single process and step S4 can be omitted.

This embodiment has the potential of being computationally less complex in the case of a limited number of candidate differential filters and gains per filter set.

Another utilization of the differential filter and adaptive gain of the present invention is to form a shaping filter. In such a case, the differential filter is preferably a symmetrical differential filter with main motive to affect the frequency response. The shaping filter can be calculated in parallel to the non-symmetric differential filter with an additional gain or by convoluting the (interpolation) filter with the differential filter. The filter gain is then applicable to the resulting shaping filter:

$$gF \times DF$$

where g is the gain, F is the (interpolation) filter provided in step S2 of FIG. 1 and DF is the symmetric differential filter and x represents convolution. In addition to a symmetrical differential filter for shaping the interpolation filter, an asymmetric differential filter can be used to make asymmetrical shaping of the filter taps at both ends of the interpolation filter as was described in the foregoing.

Another objective of the differential filter and the adaptive filter gain of the present invention can be to vary the filter length to enable and adjustment of the complexity of adaptive interpolation filtering in the decoder.

The key concept of the invention is the addition of a symmetric or non-symmetric, or indeed a combination of a symmetric and a non-symmetric, differential filter or multiple such differential filters together with an adaptive gain that is applicable directly to the differential filter or to a filter obtainable based on the differential filter, such as by convolution according to above. By then varying the gain, different interpolation filters can be produced in order to, for instance, minimize the inter or intra prediction error, the reconstruction error, or the rate distortion cost. A further advantage of the invention is that it can be used to achieve fine tuning of displacement, rotation and/or zooming of the first filter process. This tuning is preferably conducted utilizing non-symmetric differential filters.

The adaptivity of the gain can be set on any sub-set of the frame, slice, macroblock, block or even pixel levels to achieve a better filtering performance. This is basically a matter of complexity versus performance.

Figure 9:
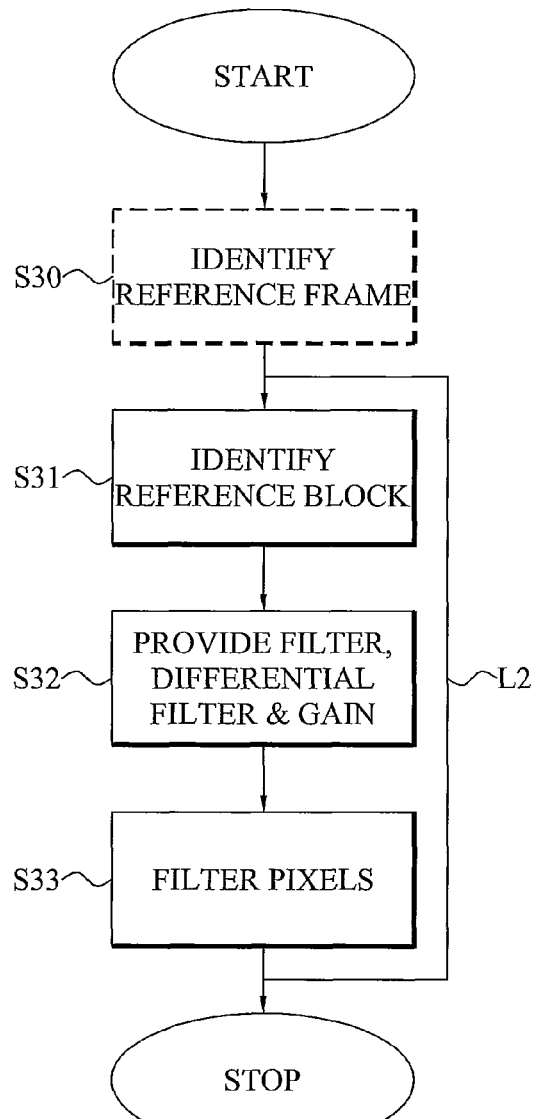
FIG. 9 is a flow diagram of a block decoding method according to the present invention.

FIG. 9 is a flow diagram of decoding a group of image elements in a frame of an encoded video sequence. The method starts in the optional step S30, where a reference frame associated with the current group is identified. If the group is intra coded, the reference frame is the current frame in the video sequence. However, for inter coded groups, the frame can, for instance, be a previous frame that is already decoded. In such a case, this reference frame can have a predefined temporal position in the video sequence relative the current frame, such as being the most previous frame. Alternatively, a frame-identifier is associated with the current frame, current slice or even current pixel group for identifying the desired reference frame.

A next step S31 identifies a reference group of image elements in the reference frame, which are utilized as a non-processed prediction of the current group. This group or block identification is performed based on a parameter representation associated with the group of image elements and present in the coded frame. The representation can be a displacement or motion vector pointing towards the reference group of image elements in the reference frame. Alternatively, the parameter representation can specify a particular intra mode that is associated with a particular decoding direction for identifying neighboring image elements in the frame to use as non-processed predictions of the current block.

A next step S32 provides at least one filter that is preferably an interpolation filter for obtaining sub-pel property values. Alternatively, the filter can be utilized for representing a (rough) rotation or zooming of the pixels in the reference group.

The at least one filter, such as at least one horizontal filter and at least one vertical filter, can be predefined, such as utilizing the H.264 interpolation filters. Alternatively, the decoder can be configured for reusing the filters of the previously decoded group of image elements in the frame. This can further be extended by modifying the filter coefficients of the filter(s) used for the neighboring decoded group based on different criterion, for instance the DC level difference between the two groups, the difference in residual error of the groups, etc. It is also possible that the group is associated with a filter modifying representation that is to be applied to the filter(s) of the neighboring group to obtain the filter to be used for the current group. This concept can of course be extended even further by actually including representations of the filter coefficients in the at least one filter used in step S32.

This step S32 also provides at least one differential filter and at least one filter gain applicable to the differential filter or a filter obtainable from the differential filter. The discussion provided above regarding the filter and how the decoder can get access to the filter applies mutatis mutandis to the differential filter and the gain. Thus, the differential filter and gain can be calculated by the decoder, re-used from neighboring group, re-used but modified or fully retrieved from the encoded group representation. In particular, the differential filter can be calculated from the filter provided.

The reference property values of the reference group identified in step S31 are then filtered in a one-step or a two-step filter process in step S33 to obtain a filter property values. In the latter case, the reference property values are first filtered using the (interpolation) filter from step S32 and are then filtered in a second filter process with a filter obtainable based on the filter gain and the differential filter to obtain a decoded group of image elements. In a first embodiment, this second filter process involves filtering the property values with a filter defined by the filter gain multiplied to the filter coefficients of the differential filter. The differential filter is then preferably non-symmetrical and is preferably a derivative filter of the filter from step S32. Alternatively, the second filter process could involve filtering the property values with a shaping filter defined by the filter gain multiplied to the filter formed by the convolution of the filter from step S32 and the differential filter. In this latter embodiment, the differential filter is preferably symmetric. Alternatively, the second filter process involves filtering the property values with both a displacement and a shaping filter.

In the case of a single filter process, a combined filter is calculated based on the filters and gain(s) provided in step S32 to form a combined filter that is applied to the reference property values of the reference group.

It is anticipated by the present invention that the filtering step S33 does not necessarily only involve the filtered pixels from step S32 but could actually also encompass some of the neighboring pixels in the partly decoded frame. Thus, a co-filtering over block boundaries is then achieved.

The loop defined by steps S31 to S33 can preferably be performed multiple times for a given block/group, which is schematically illustrated by the line L2. For instance, first a horizontal filtering is performed on the reference block in step S32 to obtain some filtered, such as interpolated, pixel values. These filtered values can then be processed in the second filtering set using at least one horizontal differential filter and gain in step S33 to form fully filtered pixel values. Thereafter a vertical filtering process is performed to obtain remaining fully filtered pixel values in the block by performing the steps S32 to S33 anew but preferably with different filters and gain.

Furthermore, the block of pixels used as reference block can differ from different pixels of a block to be decoded, in particular for intra decoding. Thus, a first neighboring block is utilized a reference block in the two-step filtering process for some of the pixels, while other pixel values are obtained in a separate two-step process involving one or more reference neighboring blocks.

Once the prediction of the current block has been obtained from the two-step filtering, the residual error is added to the filtered pixel values get the final representation of the decoded block. The method then ends.

Figure 10:
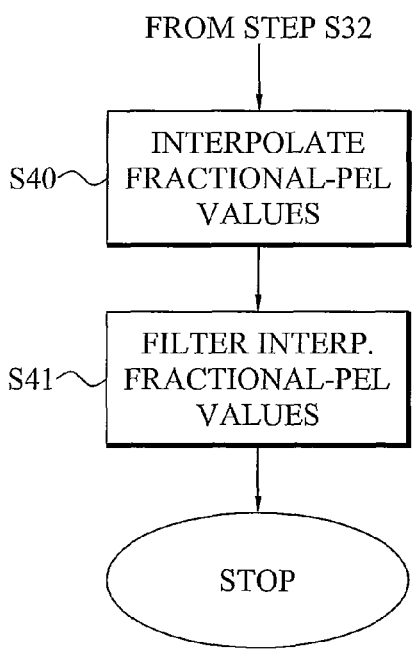
FIG. 10 is a flow diagram of the filtering step of the block decoding method according to an embodiment of the present invention.

FIG. 10 is a flow diagram illustrating an embodiment of the filtering step S33 of FIG. 9. A next step S40 interpolates fractional-pel property values by filtering the reference property values with an interpolation filter provided in step S32 of FIG. 9. A next step S41 filters the fractional-pel property values with the differential filter multiplied with the filter gain from step S32 of FIG. 9 to obtain a fine tuning of the interpolated values. The method then ends.

Figure 11:
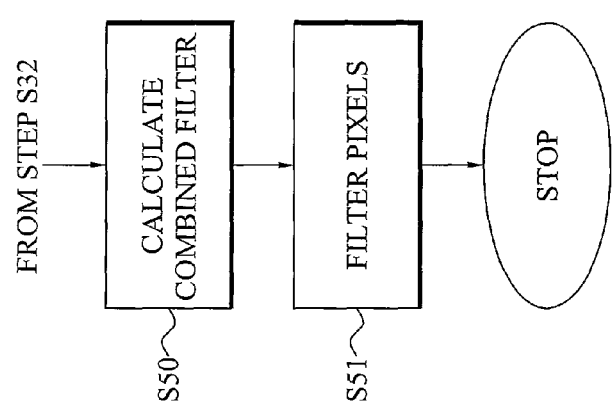
FIG. 11 is a flow diagram of the filtering step of the block decoding method according to another embodiment of the present invention.

FIG. 11 is a flow diagram illustrating another embodiment of the filtering step S33 of FIG. 9. A combined filter is calculated in step S50 based on the (interpolation) filter, differential filter and gain from step S32 of FIG. 9. This combined filter is preferably obtained through convolution of the differential filter and the (interpolation) filter and then multiplying the resulting filter with the adaptive gain. The reference property values are filtered with this combined shaping filter in step S51 to obtain decoded image elements with a frequency response shaping due to the usage of the differential filter and the filter gain.

In a particular embodiment, a single filter is calculated using gain, differential filter of the invention together with another filter. In such a case, the single filter can have integer values, a corresponding shift value and a rounding factor. For instance, the optimized filter could then consist of [1 −5 20 20 −5 1]/32 (interpolation filter according to H.264)+$g_1$×[1 −1] (differential filter for sub-pel displacement)+$g_2$×[1 −1 −1 1] (differential filter for frequency response shaping), where $g_1$ and $g_2$ are two filter gains. These filter gains are then quantized and transmitted to the decoder for respective sub-pel position.

If for instance $g_1$=0.25 and $g_2$=−0.25, the optimized filter is [1 −13 36 20 −13 1]/32. The combined filter has fractional values but can be written as a corresponding integer filter:

([1 −13 36 20 −13 1]+rounding factor)>>shift factor where rounding factor is 16 and shift factor is 6, e.g. $\frac{1}{2}^6$.

FIG. 12 is a schematic block diagram of a block encoder for encoding a group of image elements in a frame of a video sequence. A current group s is predicted by performing a displacement representation estimation by an estimator 110 from an already provided group s' in the same frame or in a previous frame. The result of the estimation is a displacement vector d associated with the reference group s', in the case of inter prediction. The displacement vector d is utilized by a motion compensation predictor 120 according to the invention for outputting an inter prediction of the group $\tilde{s}$.

Alternatively, a mode selector of the intra predictor 160 selects an intra prediction direction as direction representation. The predictor 160 also computes an intra prediction of the group $\tilde{s}$.

The inter or intra prediction $\tilde{s}$ is forwarded to an error calculator 130 that calculates a residual error e as the difference in image element values between the group s and its prediction $\tilde{s}$. The error e is transformed, such as by a discrete cosine transform 132, and quantized 134 followed by coding 140A, such as by entropy coding. In inter coding, also the estimated displacement vector d is brought to an encoder 140B for generating the coded representation of the current group s.

In the case of intra coding, the intra predictor 160 outputs a prediction $\tilde{s}$ of the current group s to the error calculator 130.

The reconstruction achieved can then optionally be further improved by an adaptive in-loop or post filter. In this case the difference between the original and filtered versions according to the invention of the reconstructed frame is minimized in a least square sense. The optimal parameters are then coded and transmitted to the decoder on a frame basis. A RD metric similarly as described above can be used for the selection of filter parameters. In order to select if the further filtering shall be used, a standard RD decision can be made involving filtering of the reconstruction with the quantized filter. In this case the SAD or SSD between the original and the filtered reconstruction is traded against the number of bits required for defining the filter multiplied with a lambda. A flag can be used to turn on/off this filtering based on this RD decision.

The encoder 140B may also receive representations of the differential filter and gain parameters utilized by the intra predictor 160 or the compensation predictor 120. In such a case, also these representations are encoded and form part of the encoded group together with the coded residual error and the coded displacement representation.

The transformed and quantized residual error e for the current group s is also provided to a dequantizer 136 and inverse transformer 138 to retrieve the original residual error. This error is added to the group prediction $\tilde{s}$ output from the displacement compensation predictor 120 or the intra predictor 160 to create a reference group s'' that can be used in the prediction and coding of a next group of image element. This new reference group s'' can optionally first be processed by a deblocking filter 150 before being available to the intra predictor 160, parameter estimator 110 and the displacement compensation predictor 120.

Figure 13:
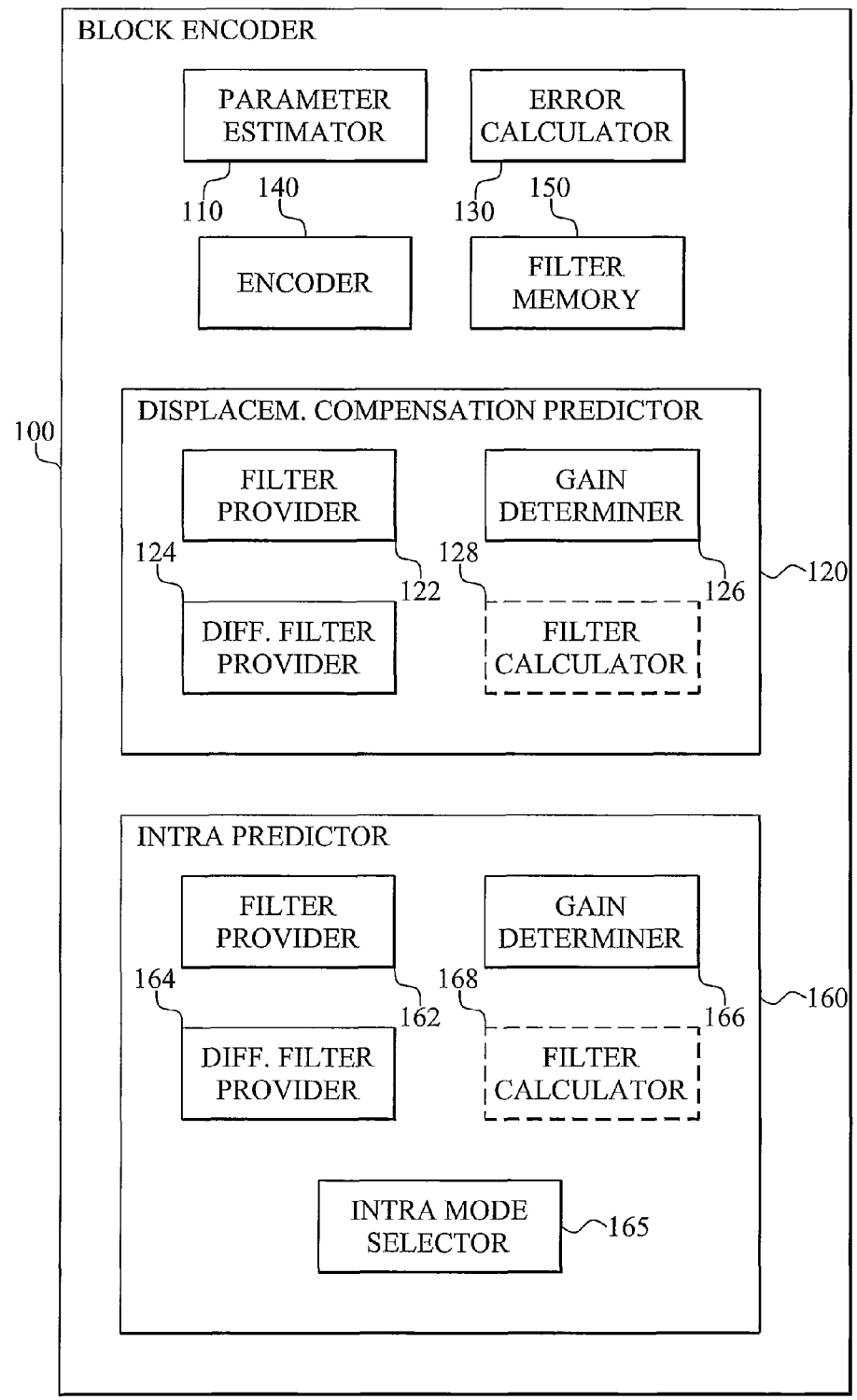
FIG. 13 is a schematic block diagram of another block encoder embodiment of the present invention.

FIG. 13 is a schematic block diagram of another embodiment of the block encoder 100. The encoder 100 preferably comprises a parameter estimator 110 arranged for estimating, based on property values of the group to be encoded, a parameter representation associated with and allowing identification of a reference group of image elements in the current frame in a reference frame in the video sequence. The parameter representation preferably comprises an optional identifier of the reference frame and a displacement vector point out the reference group in the reference frame.

For the purpose of intra encoding, this parameter estimating function can instead be realized by an intra mode selector 165 provided in an intra predictor 160. The selector 165 performs a displacement direction search by investigating the different available intra modes to find one that gives a smallest prediction error. The selector 165 then provides a mode identifier that functions as a parameter representation by specifying which particular prediction direction and thereby which particular reference group(s) of image elements to use as a basis in the prediction.

A filter provider 122; 162 is provided in a displacement compensation predictor 120 for the purpose of inter coding or in the intra predictor 160. In either case, the filter provider 122; 162 provides, based on the displacement representation from the estimator 110 or the mode selector 165, at least one filter applicable to the property values of the reference group of image elements in a first filter process. The result is filtered, preferably interpolated property values. The filter provider 122; 162 can utilize fixed filters, select among a set of pre-defined filters or calculate adaptive (interpolation) filters. In the former case, the filter coefficients can be fetched from an associated filter memory 150. In the latter two cases, the selection or calculation is performed with the objective of minimizing the prediction error between the filtered property values and the original property values to be encoded. The (interpolation) filter is preferably a frame-specific filter that is determined on a frame and displacement basis and can be re-used between different groups in the current frame.

A respective differential filter provider 124; 164 is provided in the compensation predictor 120 and the intra predictor 160. This filter provider 124; 164 provides at least one differential filter, such as a symmetric and/or asymmetric differential filter, for the current block. The filter provision can be realized by utilizing a fixed filter, selecting among pre-defined filter or calculation of an adaptive differential filter.

A respective gain determiner 126; 166 is provided in the two predictors 120; 160 for determining, based on the differential filter, the property values of the group, the (interpolation) filter and the property values of the reference group, an adaptive gain that is applicable to the differential filter. The determination is preferably performed in an error minimization process as previously described.

In the discussion above, the (interpolation) filter(s), the differential filter(s) and the gain(s) are determined or selected in separate optimization procedures. However, it is actually possible to perform a combined optimization of the filters and the gain in a single process.

An error calculator 130 is arranged for calculating a residual error based on the property values of the current group, the reference property values of the reference group and the determined (interpolation) filter(s), differential filter(s) and gain(s). This residual represents the error in representing the current group with the property values obtained by processing the reference group in the two-step filter process of the invention.

An encoder 140 is arranged in the block encoder 100 for generating a coded representation of the displacement determined by the estimator 110 or the mode selector 165 and the residual error from the calculator 130. The encoder 140 may also generate coded representations of the filters from the filter providers 122; 162 and/or the differential filter providers 124; 164 and/or the gains from the gain determiners 126; 166.

An optional respective filter calculator 128; 168 may be included for calculating a filter based on the differential filter from the differential filter provider 124; 164 and optionally the filter from the filter provider 122; 162.

In the figure the block encoder 100 has been illustrated for being able to perform both intra and inter coding. In an alternative embodiment, only those units required for intra coding (intra predictor 160, error calculator 130 and encoder 140) or for inter coding (parameter estimator 110, displacement compensation predictor 120, error calculator 130 and encoder 140) may be implemented in the block encoder 100.

As was described in the foregoing, the filtering process of the invention can be first performed in a first direction, such as horizontally, and then in another direction, such as vertically. In such a case, the filter providers 122, 124; 162, 164 and gain determiner 126; 166 preferably determines respectively horizontal filters and gains and vertical filters and gains.

The unit of the block encoder 100 may be provided as hardware, software or a combination of hardware and software.

Figure 14:
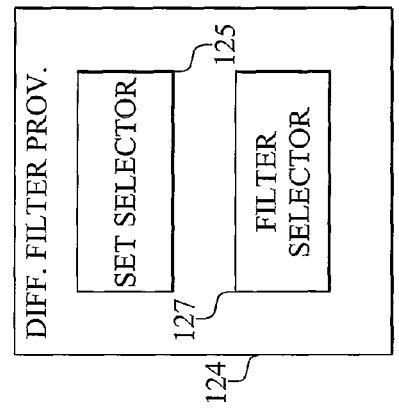
FIG. 14 is a schematic block diagram of the differential filter provider of FIG. 13 in more detail.

FIG. 14 is a block diagram illustrating a particular implementation of the differential filter provider 124 in FIG. 13. In this embodiment, the filter provider 124 has access, e.g. in the filter memory of FIG. 13, to multiple filter sets comprising at least one differential filter each. A set selector 125 then selects, preferably based on the fractional-pel resolution level obtainable through the interpolation filtering performed in the first step of the filter process. A filter selector 127 then selects, if there are more than one, a differential filter from the selected set to use as differential filter for the current group. The selection is preferably performed by minimizing a prediction error.

A corresponding differential filter providing embodiment can also be used for the filter provider 164 in the intra predictor 160 of FIG. 11.

The units of the filter provider 124 may be provided in hardware, software of a combination of hardware and software.

Figure 15:
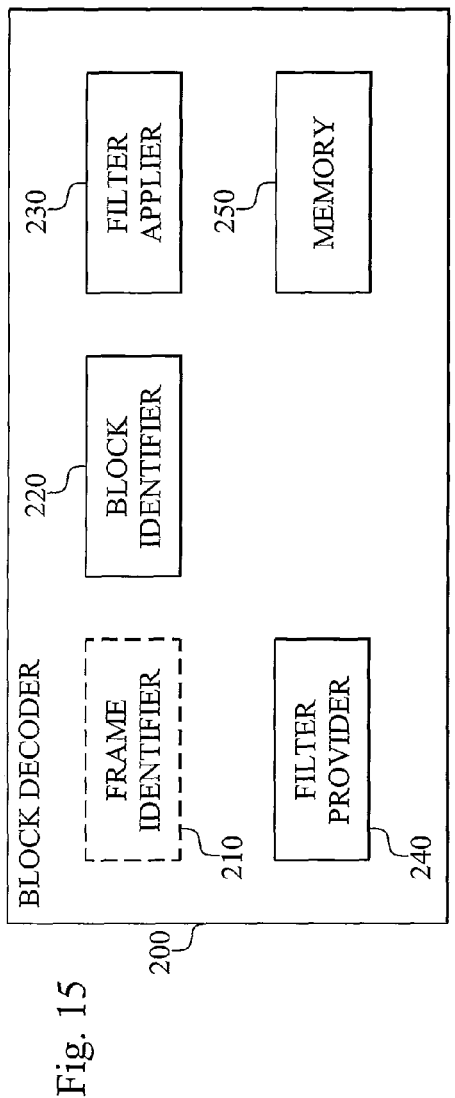
FIG. 15 is a schematic block diagram of a block decoder embodiment of the present invention.

FIG. 15 is a schematic block diagram of a decoder 200 according to the invention for decoding a group of image elements in a frame of a video sequence. The decoder 200 optionally comprises a frame identifier 210 for identifying a reference frame comprising a reference group to be used as basis in the decoding of the current group. A group or block identifier 220 is arranged for identifying the reference group in the reference frame based on a parameter representation constituting a part of the encoded representation of the group. A filter applier 230 is preferably provided for filtering the reference property values of the identified group utilizing at least one filter in a first filter process to form filtered property values. The filter to use can be fixed or frame/slice-specific and is therefore fetched from a connected memory 250. Alternatively, the filter applier 230 can calculate the filter coefficients based on information in the coded group representation and/or property values or information associated with a previously decoded neighboring group.

A filter provider 240 is arranged for providing at least one differential filter and at least one filter gain to be used in the second step of the filter process. The differential filter can be fixed or be frame-/slice-/macroblock-specific and is therefore fetched from the memory 250 or from the relevant information header level in the encoded frame sequence. Alternatively, the filter provider 240 uses encoded information in the encoded group to determine the filter parameters and/or gain. It is also possible that additional information, such as filter parameter and gain values of a neighboring group is required in this determination. The differential filter can instead be calculated based on the parameters of the (interpolation) filter used by the first filter applier 230.

The filter applier 230 uses the gain and the differential filter and possible the filter from the first filter process for defining at least one filter to be used on at least some of the already filtered property values and optionally also partly on decoded property values of a neighboring group in the frame. The result, after addition of the residual error, is the decoded representation of the image element group.

In an alternative approach, the filter provider 240 first calculates a combined filter based on the (interpolation) filter, the differential filter and the filter gain. This combined filter is applied by the filter applier 230 to the reference property values to get, after addition of the residual error, the decoded group representation.

The units of the decoder 200 may be provided as hardware, software or a combination of hardware and software.

It will be understood by a person skilled in the art that various modifications and changes may be made to the present invention without departure from the scope thereof, which is defined by the appended claims.

REFERENCES

[1] ITU-T Rec. H.264/ISO/IEC MPEG 14496-10, 2003
[2] ITU-T SG16, Multimedia terminals, systems and applications, Study Period 2005-2008, Study group 16, Contribution 210, "Separable adaptive interpolation filter"
[3] Y. Vatis and J. Osterman, "Locally adaptive non-separable interpolation filter for H.264/AVC", ICIP 2006
[4] T. Wedi, "Adaptive interpolation filter for motion and aliasing compensated filtering", VCIP 2002
[5] ITU-Telecommunications Standardization Sector, VCEG-AG05, "Adaptive Multidirectional intra prediction"

The invention claimed is:

1. A method of encoding a group of image elements in a frame of an image or video sequence, said method comprising the steps of:
   a) estimating, based on property values of said group of image elements, a parameter representation associated with a reference group of image elements in a frame, wherein the parameter representation comprises a motion vector pointing towards the reference group of image elements;
   b) providing a filter applicable to reference property values of said reference group of image elements;
   c) providing a differential filter having fixed filter coefficients;
   d) determining, based on said differential filter, said filter, said property values and said reference property values, a filter gain applicable to a filter obtainable based on said differential filter;
   e) calculating a residual error based on said property values, said parameter representation, said filter, said filter obtainable based on said differential filter and said filter gain; and
   f) providing a representation of said parameter representation and a representation of said residual error as an encoded representation of said group of image elements;
   wherein said determining step d) comprises determining said filter gain g by minimization of the prediction error E defined as:

$$E^2 = \sum_n \left( S_n - \sum_i P_{n-i} IF_i + \sum_j P_{n-j} g DF_j \right)^2$$

where $S_n$ represents the property values of image elements of group n in said frame, $P_{n-i}$ is is the reference property values of image elements of reference group n−i in said frame, IF is said filter, DF is said differential filter and g is said filter gain.

2. The method according to claim 1, wherein said providing step b) comprises providing, based on said parameter representation, an interpolation filter applicable to reference property values of said reference group of image elements to obtain interpolated fractional-pel property values.

3. The method according to claim 2, wherein
   said providing step b) comprises providing, based on said parameter representation, said interpolation filter applicable to reference property values of said reference group of image elements to obtain interpolated 1/Q-pel property values, where Q is a positive integer number larger than one, and said providing step c) comprises the steps of:
   selecting a filter set from a multitude of filter sets based on said number Q; and
   providing said differential filter from said selected filter set.

4. The method according to claim 1, wherein said providing step f) comprises providing said representation of said parameter representation, said representation of said residual error, a representation of said filter, a representation of said differential filter and a representation of said filter gain as said encoded representation of said group of image elements.

5. The method according to claim 1, wherein said reference group of image elements is provided in a reference frame in said video sequence different from said frame of said group of image elements.

6. The method according to claim 1, wherein said providing step b) comprises providing, based on said parameter representation, a frame-specific adaptive filter applicable to multiple groups of image elements in said frame.

7. The method according to claim 1, wherein said providing step c) comprises providing a non-symmetrical differential filter.

8. The method according to claim 1, wherein said providing step c) comprises providing said differential filter based on said filter.

9. The method according to claim 8, wherein said providing step c) comprises providing a non-symmetrical derivative filter based on said filter.

10. The method according to claim 1, further comprising calculating a shaping filter by convoluting said filter with said differential filter, and said determining step e) comprises determining a filter gain applicable to said shaping filter based on said shaping filter, said property values of said group of image elements and said reference property values.

11. The method according to claim 10, wherein said providing step c) comprises providing a symmetrical differential filter.

12. The method according to claim 1, further comprising:
    determining a combined filter based on said filter, said differential filter and said filter gain; and
    filtering said reference property values with said combined filter to obtained filtered reference property values, wherein said calculating step e) comprises calculating said residual error based on said property values and said filtered reference values.

13. A method of decoding a group of image elements in a frame of an encoded image or video sequence, said method comprising the steps of:
    identifying a reference group of image elements in a frame based on a parameter representation associated with said group of image elements, wherein the parameter representation comprises a motion vector pointing toward the reference group of image elements;
    providing a filter associated with said group of image elements;

providing a filter gain and a differential filter associated with said group of image elements, said differential filter having fixed filter coefficients; and filtering reference property values of said reference group of image elements with said filter and a filter obtainable based on said filter gain and said differential filter to obtain a decoded group of image elements;

wherein said filter gain g is determined by minimization of the prediction error E defined as:

$$E^2 = \sum_n \left( S_n - \sum_i P_{n-i} IF_i + \sum_j P_{n-j} gDF_j \right)^2$$

where $S_n$ represents the property values of image elements of group n in said frame, $P_{n-i}$ is the reference property values of image elements of reference group n−i in said frame, IF is said filter, DF is said differential filter and g is said filter gain.

14. The method according to claim 13, further interpolating fractional-pel property values by filtering said reference property values with an interpolation filter associated with said group of image elements and said filtering step comprises filtering said fractional-pel property values with said filter obtainable based on said filter gain and said differential filter.

15. The method according to claim 14, wherein said differential filter is a non-symmetric differential filter and said filtering step comprises fine tuning parameters of the fractional-pel interpolation by filtering said fractional-pel property values with said non-symmetric differential filter multiplied by said filter gain.

16. The method according to any of the claim 13, wherein said differential filter is a symmetric differential filter and said filtering step comprises:

calculating a shaping filter by convoluting said symmetric differential filter with said filter; and filtering said reference property values with said shaping filter multiplied by said filter gain.

17. The method according to claim 16, wherein said filtering step comprises co-filtering said reference property values and property values of a neighboring group of image elements in said frame with said shaping filter multiplied by said filter gain.

18. The method according to claim 13, wherein said filter step comprising:

determining a combined filter based on said filter, said differential filter and said filter gain; and filtering said reference property values with said combined filter to obtained said decoded group of image elements.

19. An encoder for encoding a group of image elements in a frame of an image or video sequence, said encoder comprising:

a parameter representation estimator for estimating, based on property values of said group of image elements, a parameter representation associated with a reference group of image elements in a frame, wherein the parameter representation comprises a motion vector pointing toward the reference group of image elements;

a filter provider for providing a filter applicable to reference property values of said reference group of image elements;

a differential filter provider for providing a differential filter, said differential filter having fixed filter coefficients;

a gain determiner for determining, based on said differential filter, said filter, said property values of said group of image elements and said reference property values, a filter gain applicable to a filter obtainable based on said differential filter;

an error calculator for calculating a residual error based on said property values, said parameter representation, said filter, said filter obtainable based on said differential filter and said filter gain; and a group encoder for providing a representation of said parameter representation and a representation of said residual error as an encoded representation of said group of image elements;

wherein said gain determiner determines said filter gain g by minimization of the prediction error E defined as:

$$E^2 = \sum_n \left( S_n - \sum_i P_{n-i} IF_i + \sum_j P_{n-j} gDF_j \right)^2$$

where $S_n$ represents the property values of image elements of group n in said frame, $P_{n-i}$ is the reference property values of image elements of reference group n−i in said frame, IF is said filter, DF is said differential filter and g is said filter pain.

20. The encoder according to claim 19, wherein said filter provider is adapted to provide, based on said parameter representation, an interpolation filter applicable to reference property values of said reference group of image elements to obtain interpolated fractional-pel property values.

21. The encoder according to claim 20, wherein said filter provider is adapted to provide, based on said parameter representation, said interpolation filter applicable to property values of said reference group of image elements to obtain interpolated 1/Q-pel property values, where Q is a positive integer number larger than one, and said differential filter provider comprises:

a set selector for selecting a filter set from a multitude of filter sets based on said number Q; and a filter selector for providing said differential filter from said selected filter set.

22. The encoder according to claim 19, wherein said group encoder is adapted to provide said representation of said parameter representation, said representation of said residual error, a representation of said filter, a representation of said differential filter and a representation of said filter gain as an encoded representation of said group of image elements.

23. The encoder according to claim 19, wherein said differential filter provider is adapted to provide a non-symmetrical differential filter.

24. The encoder according to claim 19, wherein said differential filter provider is adapted to provide said differential filter based on said filter.

25. The encoder according to claim 24, wherein said differential filter provider is adapted to provide a non-symmetrical derivative filter based on said filter.

26. The encoder according to claim 19, further comprising a filter calculator for calculating a shaping filter by convoluting said filter with said differential filter, and said gain determiner is adapted to determine a filter gain applicable to said shaping filter based on said shaping filter, said property values of said group of image elements and said reference property values.

27. The encoder according to claim 26, wherein said differential filter provider is adapted to provide a symmetrical differential filter.

28. The encoder according to claim 19, further comprising a filter calculator for calculating a combined filter based on said filter, said differential filter and said filter gain, wherein said error calculator is adapted to calculate said residual error based on said property values and filtered reference values obtained by filtering said reference property values with said combined filter.

29. A decoder for decoding a group of image elements in a frame of an encoded image or video sequence, said decoder comprising:
- a group identifier for identifying a reference group of image elements in a frame based on a parameter representation associated with said group of image elements, wherein the parameter representation comprises a motion vector pointing toward the reference group of image elements;
- a filter provider for providing a filter, a filter gain and a differential filter associated with said group of image elements, said differential filter having fixed filter coefficients; and
- a filter applier for filtering reference property values of said reference group of image elements with said filter and a filter obtainable based on said filter gain and said differential filter to obtain a decoded group of image elements;
wherein said filter gain q is determined by minimization of the prediction error E defined as:

$$E^2 = \sum_n \left( S_n - \sum_i P_{n-i} IF_i + \sum_j P_{n-j} g DF_j \right)^2$$

where $S_n$ represents the property values of image elements of group n in said frame, $P_{n-1}$ is the reference property values of image elements of reference group n−i in said frame, IF is said filter, DF is said differential filter and g is said filter gain.

30. The decoder according to claim 29, wherein said filter applier is adapted to interpolate fractional-pel property values by filtering reference property values of said reference group of image elements with an interpolation filter associated with said group of image elements.

31. The decoder according to claim 30, wherein said differential filter is a non-symmetric differential filter and said filter applier is adapted to fine tune a displacement of the fractional-pel interpolation by filtering said fractional-pel property values with said non-symmetric differential filter multiplied by said filter gain.

32. The decoder according to claim 29, wherein said differential filter is a symmetric differential filter and said filter provider is adapted to calculate a shaping filter by convoluting said symmetric differential filter with said filter, and said filter applier is adapted to shape a frequency response by filtering said reference property values with said shaping filter multiplied by said filter gain.

33. The decoder according to claim 32, wherein said filter applier is adapted to co-filter said reference property values and property values of a neighboring group of image elements in said frame with said shaping filter multiplied by said filter gain.

34. The decoder according to claim 29, wherein said filter provider is adapted to determine a combined filter based on said filter, said differential filter and said filter gain and said filter applier is adapted to filter said reference property values with said combined filter to obtain said decoded group of image elements.

* * * * *

UNITED STATES PATENT AND TRADEMARK OFFICE
CERTIFICATE OF CORRECTION

PATENT NO. : 8,942,505 B2
APPLICATION NO. : 12/522643
DATED : January 27, 2015
INVENTOR(S) : Andersson et al.

It is certified that error appears in the above-identified patent and that said Letters Patent is hereby corrected as shown below:

In the Specification

In Column 1, Line 8, delete "Dec. 27, 2007," and insert -- Dec. 17, 2007, --, therefor.

In Column 9, Line 55, delete "$0 \geq i < N-1$" and insert -- $0 \leq i < N-1$ --, therefor.

In Column 10, Line 50, delete "distorsion" and insert -- distortion --, therefor.

In Column 11, Lines 36-37, delete "distorsion" and insert -- distortion --, therefor.

In the Claims

In Column 19, Line 64, in Claim 1, delete "is is the" and insert -- is the --, therefor.

In Column 21, Line 35, in Claim 16, delete "to any of the claim" and insert -- to claim --, therefor.

In Column 22, Line 26, in Claim 19, delete "filter pain." and insert -- filter gain. --, therefor.

In Column 23, Line 25, in Claim 29, delete "gain q" and insert -- gain g --, therefor.

In Column 23, Line 33, in Claim 29, delete "$P_{n-1}$" and insert -- $P_{n-i}$ --, therefor.

Signed and Sealed this
Eleventh Day of August, 2015

Michelle K. Lee
*Director of the United States Patent and Trademark Office*